United States Patent
Murphy, Jr. et al.

[11] 3,967,493
[45] July 6, 1976

[54] ACCELERATION SENSING MECHANISM

[75] Inventors: Frank W. Murphy, Jr., Tulsa; Teddy Howard Cruse, Broken Arrow, both of Okla.

[73] Assignee: Frank W. Murphy Manufacturer, Inc., Tulsa, Okla.

[22] Filed: July 25, 1975

[21] Appl. No.: 599,138

[52] U.S. Cl. ............................. 73/71; 116/114 AH; 137/45
[51] Int. Cl.² ..................... G01P 15/02; G05B 9/00; G05D 19/00
[58] Field of Search .............. 73/71, 71.2, 492, 514, 73/515; 137/45, 48; 200/61.45 M; 116/114 AH

[56] References Cited
UNITED STATES PATENTS
3,448,228  6/1969  Munroe ...................... 200/61.45 M Primary Examiner—James J. Gill
Attorney, Agent, or Firm—D. Paul Weaver

[57] ABSTRACT

A vibration or shock (acceleration) responsive lever is normally held by magnetic attraction in a latched position for closing a control fluid (air) vent valve. The lever is resiliently biased to a tripped vent valve opening position by a force of lesser magnitude than the magnetic latching force. The unit may be mounted vertically or horizontally and possesses manual and remote lever reset means. A sensitivity adjustment is directly accessible through the cover plate of the body or housing of the device. Fewer parts of simpler construction are employed compared to the prior art.

7 Claims, 8 Drawing Figures

ACCELERATION SENSING MECHANISM

BACKGROUND OF THE INVENTION

Acceleration sensing devices for use in connection with machines which require monitoring and shutting down under certain conditions of operation are known in the prior art. Some examples of the patented prior art to which the present invention relates are U.S. Pat. Nos. 2,942,456; 3,448,228 and 3,641,290.

A need exists for a simpler, less expensive and more reliable acceleration sensing unit of the class shown in the above prior art patents, and it is the objective of this invention to satisfy this need. In accordance with the present invention, a shock and vibration responsive device employs an operating mechanism which embodies significantly fewer parts than comparable prior art devices. The invention has a fuller range of adjustability including a unique and simplified sensitivity adjustment of the armature carried by a spring-loaded lever arm in relation to an opposing stationary potted magnet. An improved soft rubber valve closure disc or seat adjustably mounted on the pivoted lever arm and resiliently biased toward the control fluid vent valve constitutes another key improvement over the prior art. An adjustable spring-loaded manual reset button for the device also serving as a visual trip indicator forms a further feature of the invention. Another important feature resides in an adjustable leveling stop for the pivoted lever arm assuring parallelism between the arm and the holding face of the potted magnet when the arm is latched in the vent valve closing position. A fluid pressure responsive remote resetting means for the pivoted lever, separate from the manual resetting button, is also provided on the unit.

Other features and advantages of the invention will become apparent during the course of the following description.

BRIEF DESCRIPTION OF DRAWING FIGURES

DETAILED DESCRIPTION

Figure 1:
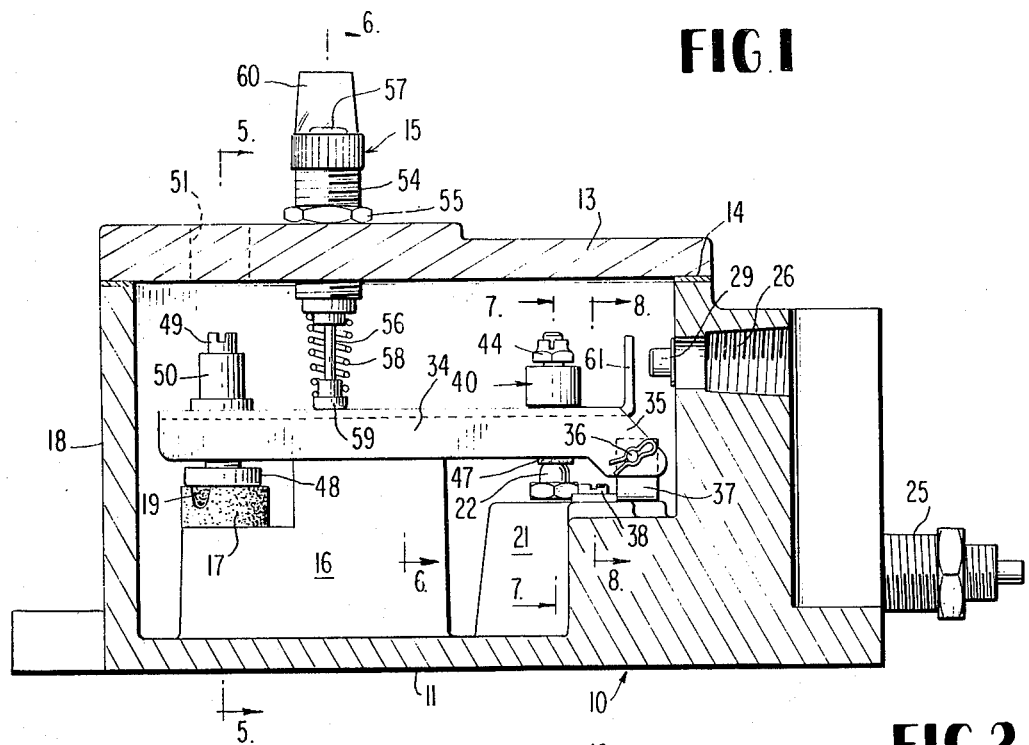
FIG. 1 is a side elevational view of the invention with the body or housing in section showing the control lever arm in the magnetically latched position.
Figure 2:
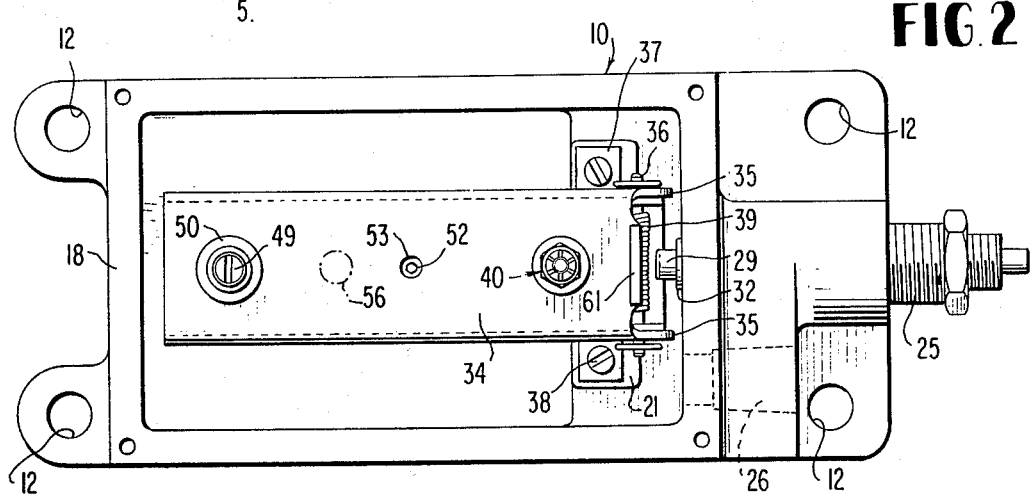
FIG. 2 is a plan view of the device in FIG. 1 with the cover plate and associated parts removed.
Figure 3:
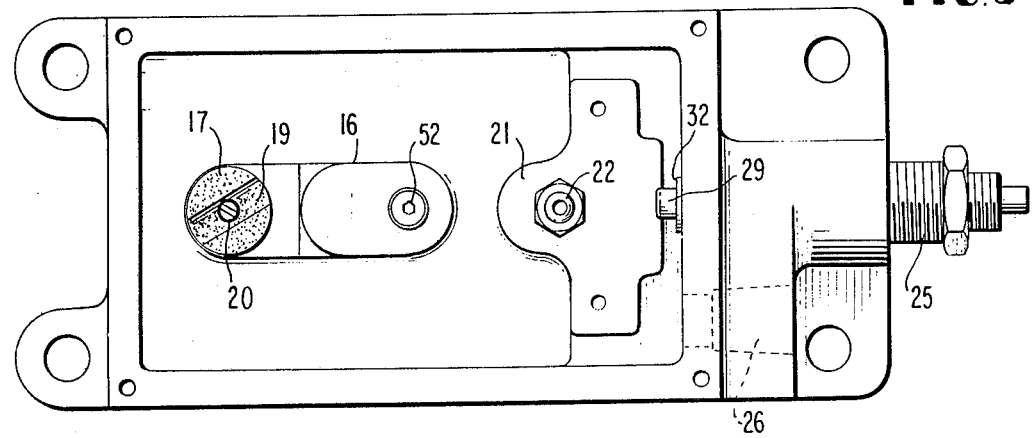
FIG. 3 is a similar plan view with the pivoted lever arm and associated parts removed.

Referring to the drawings in detail wherein like numerals designate like parts, the numeral 10 designates a body or housing for the acceleration sensing mechanism including a flat mounting face 11 which may be arranged horizontally, vertically or at an intermediate angle with relation to a wall of the machine being protected. The body 10 is fixedly mounted by bolts, not shown, received through openings 12 in flange extensions of the body 10. The unit will be mounted in any case so that the anticipated shock or vibration (acceleration) axis is across the pivoted control lever arm and parallel to the axis of the permanent magnet.

The body or housing 10 is open at the side opposite the flat mounting face 11 and this open side is covered by a removable cover plate 13 having a sealing gasket 14. The cover plate 13 serves to mount an adjustable manual reset and visual indicator assembly 15, to be described in detail.

Figure 5:
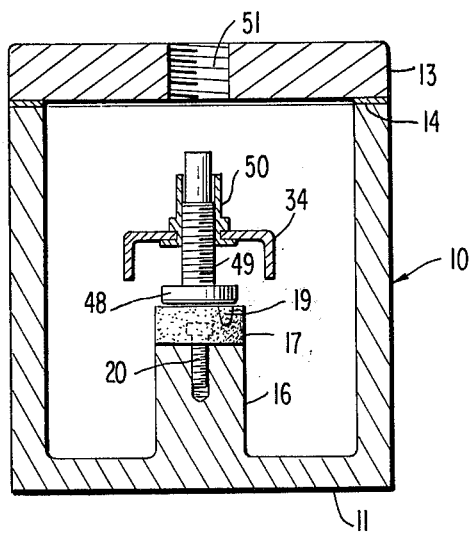
FIG. 5 is a vertical section taken on line 5—5 of FIG. 1.

Internally, the body 10 has a raised stepped boss 16, on the lower step of which is fixedly mounted a potted permanent magnet 17 disposed near an end wall 18 of the body 10. The potted magnet is recessed at 19 for the reception of a magnet attaching screw 20 having threaded engagement with the boss 16. The head of the screw 20, FIG. 5, is recessed well below the top flat attractive face of the magnet 17.

Figure 7:
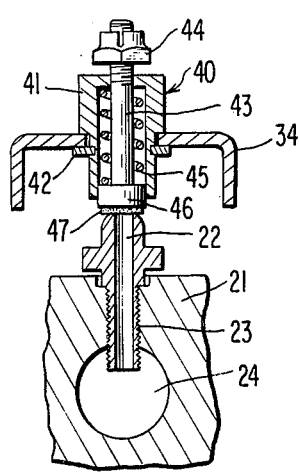
FIG. 7 is a similar section taken on line 7—7 of FIG. 1.

Another elevated boss 21 within the body 10 and near the other end of the body serves to mount a control fluid (air) vent valve 22 whose threaded stem 23, FIG. 7, is anchored within the boss 21 in communication with a control fluid passage 24 receiving a fluid inlet fitting 25 of a conventional type projecting from the end face of the body 10 remote from the wall 18. A vent port 26 opens through the same end of the body 10, preferably near the top thereof, and this port communicates directly with the interior chamber of the device, housing the trip mechanism.

Figure 4:
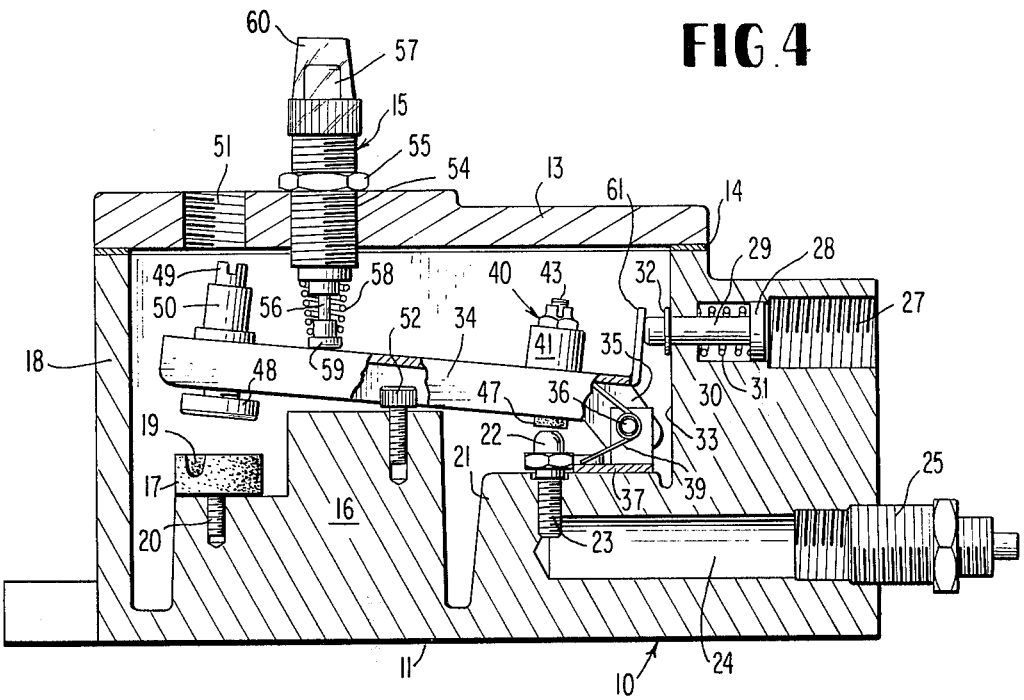
FIG. 4 is a view similar to FIG. 1 showing the device tripped in response to acceleration and in a control fluid venting mode.

Additionally, FIG. 4, the body 10 is provided in its same end with another threaded port 27 adapted to receive a pressure fluid inlet fitting, not shown, for delivering fluid pressure against the heat 28 of a remote reset plunger 29 received movably in a bore 30 and biased outwardly to a non-resetting position by a spring 31, the outward movement of the plunger 29 limited by a stop washer 32 thereon engageable with a flat internal face 33 of body or housing 10.

Figure 8:
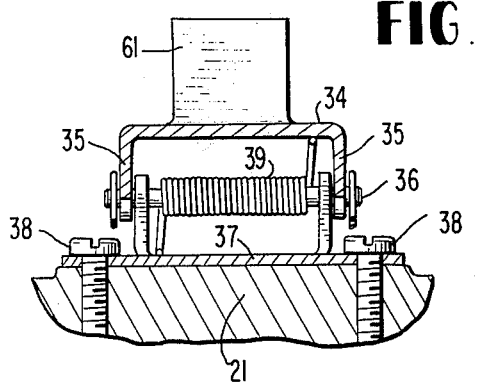
FIG. 8 is a similar section on an enlarged scale taken on line 8—8 of FIG. 1.

A pivoted rigid control lever arm 34, preferably of channel formation in cross section, overlies the bosses 16 and 21 and has end extensions 35 pivoted on a cross pin 36 to a support bracket 37 rigidly attached at 38, FIG. 8, to the top of boss 21. A torsional coil spring 39 surrounding pivot pin 36 resiliently biases lever arm 34 to a tripped or venting position shown in FIG. 4 where the lever arm has separated from the holding magnet 17 in response to acceleration forces. The biasing force exerted on lever arm 34 by spring 39 is somewhat less than the attractive force of magnet 17, but when the spring force is coupled with the acceleration force which the device is set to sense or respond to, the control lever arm 34 will assume the tripped or venting position shown in FIG. 4.

On the lever arm 34 relatively near the pivot element 36 and in opposing relation to the venting valve element 22 is a very efficient adjustable spring-loaded valve closure unit 40. The unit or assembly 40 comprises a housing 41 fixed on lever arm 34 by a snap ring 42 or the like and containing a stem 43, FIG. 7, having an adjustable stop nut 44 on a top threaded end portion thereof which adjusts the extent of axial movement of the stem 43 relative to the housing 41 under influence of a biasing spring 45 in the housing 41 bearing on a head 46 of this stem. The end face of head 46 carries a soft rubber vent valve closure disc 47 adapted to abut and seal the control fluid escape port of the valve 22 as shown in FIG. 7 when the lever arm 34 is latched by the magnet 17 as shown in FIG. 1. At this time, the rubber disc 47 is compressed against the mouth of valve 22 to effectively seal it. This rubber closure element 47 is superior to other types of closures, such as balls, since it cannot wear, corrode or the like. It is more effective in resisting clogging of the vent valve by foreign matter than other types of closure elements or seats.

Near the end of the lever arm 34 remote from its pivot 36 is an adjustable armature 48, FIG. 5, forming an important feature of the invention. This disc-like armature 48 which opposes the magnet 17 and is latched thereby at proper times is carried by one end of a threaded adjusting stem 49 having threaded engagement in a tubular nut 50 affixed to the lever arm 34. An opening 51 in the cover plate 13 is aligned with the stem 49 so that the latter may be turned with a screwdriver from the exterior of the closed assembly. The arrangement forms a fine sensitivity adjustment for the armature 48 and lever arm 34 relative to the stationary magnet 17 and the adjustment can be made from the exterior of the closed unit, as stated.

A further feature of the invention resides in the provision near the longitudinal center of the lever arm 34 of an adjustable screw leveling stop 52 anchored in the top step of boss 16, FIG. 4, and accessible for adjusting through an opening 53 provided in the arm 34. This screw stop or leveling stop assures parallelism between the working face of armature 48 and the opposing flat face of permanent magnet 17. This, in turn, assures an efficient "bond" or latching action between the permanent magnet and armature.

Figure 6:
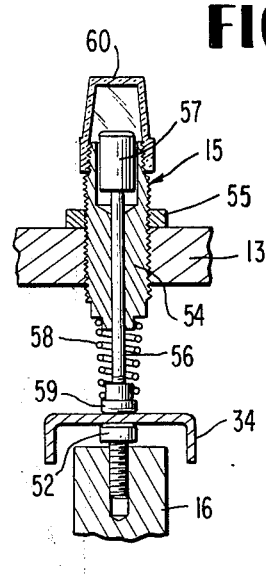
FIG. 6 is a fragmentary vertical section taken on line 6—6 of FIG. 1.

As previously mentioned, the manual reset and visual indicator assembly 15 is mounted bodily on the cover plate 13 and consists of a threaded body 54, FIG. 6, adjustably held in a threaded opening of the cover plate and locked in the adjusted position by a lock nut 55. A reset plunger or stem 56 having an outer end push button 57 is mounted to reciprocate in the adjustable body 54 and is biased by a spring 58 into yielding contact with the top of lever arm 34 at a point spaced substantially from the pivot 36 and spaced a considerably lesser distance from the armature 48 and associated sensitivity adjustment means. The lower end of stem 56 carries a lever contact element 59 formed of molded nylon or the like and this element serves to seat one end of the spring 58.

A transparent removable cap 60 serves to enclose the push button 57 which may be brightly colored to serve as a visual indicator when the lever arm 34 has been tripped by shock or vibration forces, FIG. 4. The button 57 is normally depressed, FIG. 1, when the mechanism is latched by magnetic attraction and the control fluid vent valve 22 is closed. The button 57 following removal of the cap 60 additionally forms a convenient manual resetting means for the control lever arm 34, and accessible from the exterior of the assembly.

To facilitate remote resetting of the mechanism by fluid pressure from the already-described plunger means 29, the lever arm 34 at its pivoted end carries an upturned extension 61 immediately in advance of the spring retracted plunger 29. When the lever arm is tripped, FIG. 4, and when fluid pressure is applied to the plunger head 28, the plunger will extend against the force of spring 31 and by engagement with lever extension 61 will reset the lever arm 34 with its armature 48 magnetically coupled with permanent magnet 17. It will be clear to anyone skilled in the art that when the lever arm 34 is tripped by acceleration forces, FIG. 4, the valve 22 will vent control fluid such as air. When the lever arm is latched, FIG. 1, the vent valve will be closed and sealed by the rubber disc 47. The sensitivity of the device may be finely regulated by turning the stem 49 with a screwdriver. The screw stop 52 assures leveling or parallelism of the lever 34 and armature 48 with respect to the fixed magnet 17. The spring loading of the stem 56 assures contact thereof with the lever arm 34 regardless of the angle at which the body 10 is mounted. The other operational features of the device require no further description and should be fully understood by anyone skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An acceleration sensing device comprising a body portion attachable to a device which is subject to acceleration forces and having a mechanism chamber and a cover plate for such chamber, a control fluid vent valve secured to the body portion within said chamber, control fluid passage means leading to said vent valve and formed in said body portion, a control lever arm within said chamber in opposing relation to the vent valve, means pivoting one end of the lever arm to the body portion near and on one side of the vent valve, an axially adjustable spring-biased vent valve closure stem on said control arm in opposing relation to the vent valve and having a compressible rubber-like closure disc on one end thereof adapted to engage and seal the control fluid vent port of said valve when said lever arm is in a latched position, a permanent magnet latching element fixed to the body portion near the end of the lever arm remote from said pivot means, a latching armature carried by the lever arm in opposed relation to said magnet latching element, a sensitivity adjustment means for said lever arm coupled with said armature and being accessible from the exterior of said device through an access opening in said cover plate, a manual lever arm reset and visual indicator assembly on said cover plate in opposing relation to the pivoted lever arm and including a plunger component which is resiliently biased into contact with a side of the lever arm remote from the magnet element, and a remote reset means for the lever arm responsive to fluid pressure from a remote source and mounted on said body portion.

2. An acceleration sensing device as defined by claim 1, and said vent valve closure stem held slidably in a housing fixed on said control arm, and a biasing spring in said housing surrounding said stem and urging the stem with said rubber-like closure disc into closing engagement with said vent valve.

3. An acceleration sensing device as defined by claim 1, and said sensitivity adjustment means comprising a nut secured to said control lever arm, a threaded stem engageable within the nut, and said armature comprising a disc-like armature secured to the threaded stem near the side of the control lever arm facing the permanent magnet latching element.

4. An acceleration sensing device as defined by claim 1, and said manual lever arm reset and visual indicator assembly further comprising an adjustable threaded body mounted on said cover plate and having a through bore receiving said plunger component for reciprocation, said plunger component having an end contact head directly engaging said lever arm slidably, a biasing spring surrounding said plunger component and engaging said threaded body and said contact head, and a button element on the opposite end of said plunger component exteriorly of said threaded body and cover plate and operable manually from the exterior of said device to reset said lever arm.

5. An acceleration sensing device as defined by claim 4, and said lever arm reset and visual indicator assembly further comprising a transparent cap threadably engaged with the outer end of the threaded body exteriorly of said cover plate, said button element visible through said cap to serve as an indicator when said lever arm is tripped responsive to acceleration forces and separated from said magnet latching element, said button then projecting outwardly from its normally depressed position within said threaded body.

6. An acceleration sensing device as defined by claim 1, and said remote reset means comprising a plunger element on said body portion responding to fluid pressure from an external source, a spring biasing the plunger element to an inactive position relative to said lever arm, said plunger element extending into said mechanism chamber, and a lateral extension on the lever arm near the pivot thereof and disposed in the axial path of movement of said plunger element.

7. An acceleration sensing device as defined by claim 1, and said means pivoting one end of the lever arm to the body portion comprising a bracket fixed to the body portion in the mechanism chamber, a pivot pin held by the bracket, lever arm extensions pivotally mounted on said pin, and a torsion spring on said pin interconnecting the lever arm and said body portion and resiliently biasing the lever arm away from the permanent magnet latching element with a lesser force than the magnetic holding force of the magnet element on said latching armature.

* * * * *